United States Patent [19]
Marbach

[11] 4,360,396
[45] Nov. 23, 1982

[54] INFLATABLE ELEMENT AND METHOD OF MAKING SAME

[75] Inventor: Gerard Marbach, Cernay, France

[73] Assignee: Sevylor, France

[21] Appl. No.: 147,245

[22] Filed: May 6, 1980

[30] Foreign Application Priority Data

May 17, 1979 [FR] France ................................ 79 12930

[51] Int. Cl.³ .............................................. B29D 23/10
[52] U.S. Cl. .................................... 156/70; 156/304.2; 156/119; 156/218; 114/346
[58] Field of Search .......................... 9/1.3, 2 A, 11 A; 156/217, 218, 118, 119, 198, 69, 304.1, 304.2, 304.6

[56] References Cited
U.S. PATENT DOCUMENTS

2,440,664  4/1948  Irons .................................... 156/218
4,083,070  4/1978  Martin ......................................... 9/11

*Primary Examiner*—Trygve M. Blix
*Assistant Examiner*—Thomas J. Brahan
*Attorney, Agent, or Firm*—Robert E. Burns; Emmanuel J. Lobato; Bruce L. Adams

[57] ABSTRACT

This annular inflatable element comprises two ring-shaped elements interconnected by an inner closed belt and an outer closed belt. All these elements are welded together, and all the welds are of the sleeve coupling type without requiring any complementary or additional welding operation. The last sleeve-coupling weld is formed by placing the outer belt against the inner surface of the annular electrode, and the belt lips are folded firstly outwardly and then inwardly between the electrode and registering contra-electrodes. Paper welding barrier are interposed between the first and second folded portions of the belt lips, and the lips of the ring-shaped elements are placed against the contra-electrodes, respectively, so that the last two sleeve-coupling welds can be accomplished simultaneously. This invention is applicable notably to the manufacture of rubber dinghies.

7 Claims, 7 Drawing Figures

INFLATABLE ELEMENT AND METHOD OF MAKING SAME

FIELD OF THE INVENTION

This invention relates in general to inflatable elements having substantially the shape of a closed ring, made from plastomer or elastomer sheets with or without support means, assembled by welding, and comprising a closing insert consisting of a closed-loop belt extending along the entire inner or outer periphery of the annular inflatable element, and at least one lip welded to the remaining portion of the inflatable element.

DESCRIPTION OF THE PRIOR ART

In known annular inflatable elements of this type, such as the element shown in fragmentary and diagrammatic section in FIGS. 1 and 2, the last weld of the last lip of the external closed belt 1, or more generally the last two welds 2,2' made simultaneously on the two lips 3 and 4 of said closed belt, comprise "straight" welds. The term "straight weld" designates herein a weld seam in which a belt lip, such as 3, and the registering lip 5 of the remaining portion 6 of the annular inflatable element are disposed in parallel relationship during the welding operation, the end edges 7 and 8 respectively of these two lips 3,5 extending substantially outwards from the inflatable element as shown by the arrow 9. However, this type of weld is objectionable in that it has a relatively poor tensile strength, even lower than the tensile strength of the sheet material constituting the inflatable element; in fact, when the element is inflated, the belt edge and the edge of the remaining portion of the inflatable annular element are constantly urged in substantially opposed directions as shown at 10 and 11, at right angles to the weld surface, so that the seam 2 is constantly tear stressed. This is a far from negligible inconvenience, especially in case the annular inflatable element is incorporated for example in a rubber dinghy structure, since the boat strength and the passengers' safety are subordinate to the resistance of the last straight weld or welds.

SUMMARY OF THE INVENTION

With the annular inflatable element according to the present invention this inconvenience is avoided by eliminating the last straight weld or welds and replacing same with another type of weld having a tensile strength considerably higher than that obtained in the prior art, and even substantially equal to the tensile strength of the sheets of plastomer or elastomer constituting the inflatable element proper. The strength of the annular inflatable element is thus improved to a substantial degree while preserving the structural simplicity and easy construction characteristics of the inflatable element.

The annular inflatable element according to this invention is characterized in that all the closing welds of this annular inflatable element, i.e. all the seams determining the external volume of this annular inflatable element, consist of "sleeve-coupling welds" formed in a one-step fashion. The term "sleeve-coupling weld" means a weld in which the edge of the closed belt and the corresponding lip of the remaining portion of the inflatable element are still disposed parallel to each other during the welding operation; however, the end portions of these two lips are directed the one inwardly and the other outwardly of the inflatable element.

This invention is also directed to provide a method of making the annular inflatable element broadly described hereinabove, and constituting the subject-matter of this invention.

Up to now, no method has been proposed for producing an annular inflatable element of this character with all closing welds made according to this "sleeve coupling" procedure in a one-step fashion. In fact, the only method implemented in the art consisted in a first step in welding a first lateral edge of the closed belt insert to the registering first edge of the remaining portion of the inflatable element; in a second step, the second lip of the belt insert was welded to the registering second lip of the remaining portion of the inflatable element by using an electrode of reduced length and volume; thus, the perimeter of the closed belt could be welded by successive small juxtaposed portions, the weld ending in the vicinity of the valve so that the electrode could be recovered through the valve orifice. This obviously constituted a long and tedious procedure.

The manufacturing method according to the present invention eliminates these inconveniences, the last external sleeve-coupled weld or pair of welds of an annular inflatable element being obtained rapidly and easily in a single step.

When carrying out the method of the present invention, during the last operation consisting in welding at least one of the lips of the closing insert in the form of a closed belt to the registering lip of the remaining structure of the annular inflatable element, these two lips, as in the prior art procedure, are assembled and positioned for proper engagement by an electrode and at least one contra-electrode, and the free end of the lip of the remaining portion of the inflatable element is directed substantially outwardly of this element. The method of the present invention is characterized in that the free end of the lip of the closed belt insert extends substantially inwardly of the inflatable element, and that one portion of the closed belt which is adjacent to the lip thereof is folded or bent on itself between the electrode and the contra-electrode, on the side opposed to the lip of the remaining portion of the inflatable element, the remaining portion of the belt being directed inwardly of the inflatable element.

In the present specification, the term "contra-electrode" is used for designating both the detachable contra-electrode proper and either of the plates of a welding press used for assembling the components of the inflatable element.

Moreover, a welding barrier is disposed between the lip of the closed belt and the folded portion, adjacent thereto, of said closed belt. In a modified form of embodiment, the material constituting the welding barrier is assembled, prior to the welding step proper, to the lip of the belt insert and/or of the portion adjacent to said lip; the barrier material may consist for example of a silicone layer, or a layer of insulating varnish, of a printing layer such as ink, or a deposit obtained by applying loaded liquids, such as calcareous or lime water. In other modified forms of embodiment, the welding barrier material may consist for example of a free element capable, subsequent to the welding step, of moving freely inside the annular inflatable element; in this case, a polyethylene or paper sheet may be used.

DESCRIPTION OF THE PREFERRED EMBODIMENTS

Figure 1:
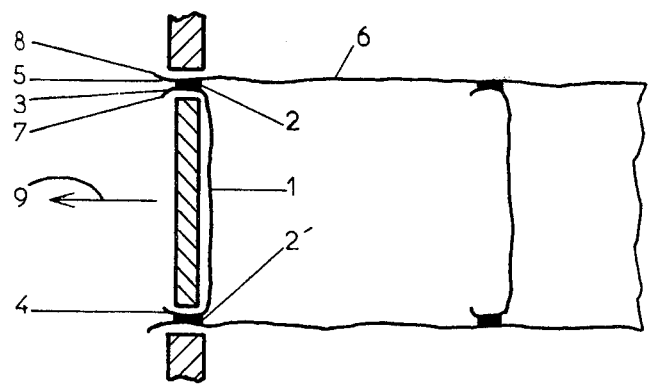
FIG. 1 illustrates schematically in fragmentary cross section the making of the last weld of an inflatable element according to prior art.
Figure 2:
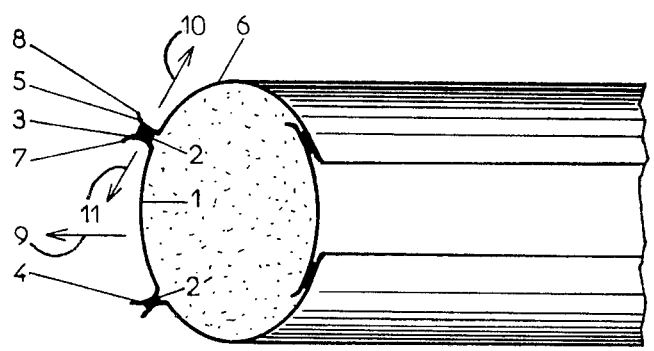
FIG. 2 is a diagramatic and framentary sectional view of the element in inflated condition.
Figure 3:
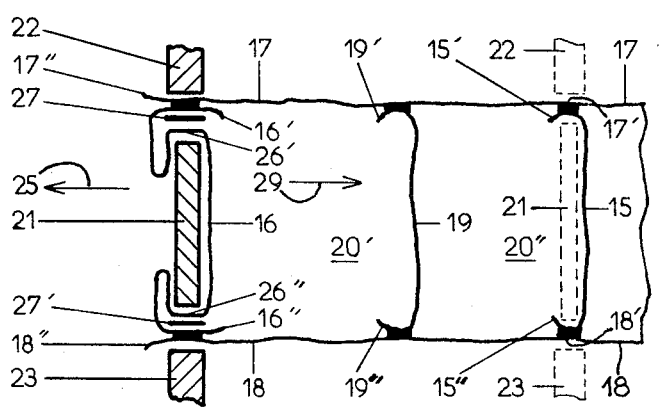
FIG. 3 illustrates in fragmentary and diagrammatic cross section a first form of embodiment of an annular inflatable element, during a welding operation.
Figure 4:
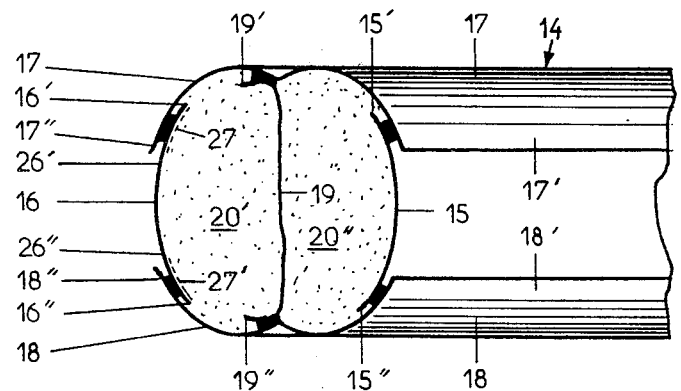
FIG. 4 is a diagrammatic and fragmentary sectional view showing a first form of embodiment of the annular inflatable element in its inflated condition.

The annular inflatable element shown in axial section in FIGS. 3 and 4 comprises two closing pieces 15 and 16 consisting each of closed belt, i.e. a flexible band having its two ends welded in a fluid-tight manner to each other so as to constitute an endless band. The one closed belt 15 extends throughout the inner periphery of the annular inflatable element, and the other closed belt 16 extends throughout the outer periphery of the same annular inflatable element. The remaining portion of the inflatable element consists of a pair of flexible rings 17 and 18 having each their intermediate portion welded to one of the lips 19',19" respectively of a flexible partition 19 which, in this example, divides the annular inflatable element into two compartments 20' and 20" adapted to be inflated separately in order to improve the safety and buoyance of the inflatable element.

The various pieces of flexible material constituting the annular inflatable element are assembled as follows: firstly, the lips 15',15" of belt 15 are welded tightly to the first corresponding lips 17',18' of the pair of ring-shaped pieces 17 and 18, respectively, by using for example an annular electrode 21 and a pair of contra-electrodes 22 and 23 shown in phantom lines in FIG. 3. As the second corresponding lips 17" nd 18" of ring-shaped pieces 17 and 18, respectively, are free, it is now an easy matter to assemble by "sleeve welding" the lips 15' and 15" to lips 17' and 18', respectively, and to subsequently release the flexible pieces 17 and 18 from electrode 21. Similarly, the electrode 21 and contra-electrodes 22 and 23 are utilized for welding the lips 19' and 19" of a flexible partition 19 to the intermediate portion of the pair of ring-shaped pieces 17 and 18, also by sleeve coupling, whereafter these flexible ring-shaped pieces 17 and 18 are released from the electrode 21. To perform the last welding step, the various elements are eventually disposed as shown in FIG. 3. The annular electrode 21 is "lined" by disposing the annular closed belt 16 on the inner periphery of this electrode and then folding back the lips 16' and 16" of belt 16 outwardly, as shown by the arrow 25 (FIG. 3). The free end of each lip 16', 16" is then turned inwardly of compartment 20' of the inflatable element, portions 26' and 26" of belt 16, which are adjacent to lips 16' and 16" being thus folded on themselves. With portions 16' and 16" thus disposed between the electrode 21 and contra-electrode 22, a welding barrier consisting, in this example, of a free paper strip 27 is disposed between the lip 16' and the folded portion 26'. Similarly, portions 16" and 26" are disposed between the electrode 21 and contra-electrode 23, with a second welding barrier 27' identical with the first one disposed between the lip 16" and the folded portion 26". The remaining portion of the closed belt 16 will thus extend inwardly of the electrode 21, that is, towards the inner space of the compartment 20' of the inflatable element.

The lip 17" of annular piece 17 is then introduced into the gap formed between the contra-electrode 22 and lip 16', the free end of this lip 17" being directed outwardly of portion 20'. Similarly, the lip 18" of annular piece 18 is inserted into the gap formed between the contra-electrode 23 and lip 16", the free end of this lip 18" extending outwards in relation of said compartment 20'. Thus, the folded adjacent portions 26' and 26" are located opposite the lips 17" and 18" of the remaining portion of the inflatable element, with respect to lips 16' and 16", respectively. Upon completion of the welding operation proper, the inflatable element can easily be released in the direction 29 from the gap left between the electrode 21 and the contra-electrode 22.

Considering now the annular inflatable element thus completed, notably in the inflated condition (FIG. 4), it will be seen that the last two welds accomplished in this example in a single operation are of the "sleeve coupling" type. In fact, the paper strips 27 and 27', during the welding step, prevented the welding of lip 16' to its adjacent portion 26', on the one hand, and also of the lip 26" to its adjaent portion 26", on the other hand; these strips can subsequently move freely inside the compartment 20' of the inflatable element, without any inconvenience for this element.

Figure 7:
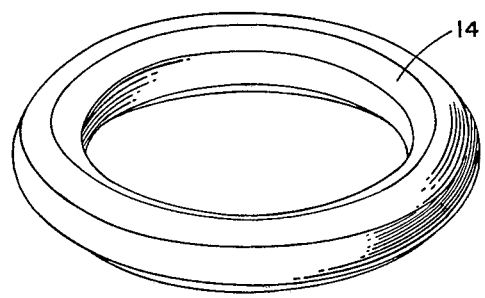
FIG. 7 is a perspective view of an annular inflatable element made in accordance with the invention.

Thus, in the completed annular inflatable element as shown in FIG. 7, all the closing welds are of the so-called "sleeve coupling" type, and obtained in a single operation, and extend throughout the periphery of the inflatable element.

Of course, it would not constitute a departure from the present invention to substitute the plates of the welding presses for the contra-electrodes 22 and 23.

Figure 5:
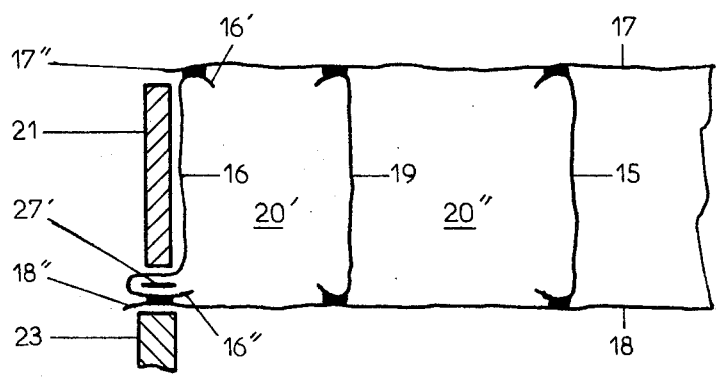
FIG. 5 is a view similar to FIG. 3 showing a first modified form of embodiment of the annular inflatable element of said FIG. 3, during a welded step.

FIG. 5 illustrates the same annular inflatable element as the one disclosed hereinabove, during the last welding operation. The procedure differs somewhat from the preceding one solely in that only the last weld between lip 16" and 18" is accomplished by using the method of this invention. In fact the lips 16' and 17" have been welded beforehand during an additional step, since it was possible to form a sleeve coupling weld without resorting to a weld barrier 27 as in the preceding case for welding partitions 15 and 19.

Figure 6:
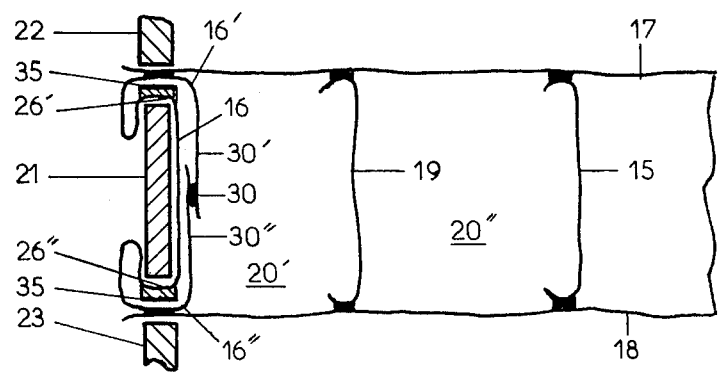
FIG. 6 is a view similar to FIG. 5 showing another modified form of embodiment of an annular inflatable element during a welding step.

FIG. 6 illustrates the same annular inflatable element during the last welding step. In this modified embodiment based on the first one shown in FIGS. 3 and 4, the two lateral lips 16' and 16" of closed belt 16 comprise extension 30',30" pre-assembled with each other as shown at 30. This assembly, obtained for example by welding or gluing, or possibly by spot welding, is only provisional and its only purpose is to keep the lips assembled during the actual welding step. The external closed belt 16 will thus constitute a kind of tube which can more easily be positioned on the electrode 21 (FIG. 6), portions 16' and 16" being held automatically in position so as to register with the corresponding portions 26' and 26". In this modified embodiment, the welding barriers consist advantageously but not compulsorily of layers of insulating varnish 35 deposited beforehand on belt 16 for example at the locations contemplated for portions 26' and 26". The other elements are identical with those of the first form of embodiment (FIGS. 3 and 4). Except for the positionning of the tubular element 16 on electrode 21, the complete sequence of operations required for performing the last welding step is the same as that already described with reference to FIGS. 3 and 4.

Of course, it would not constitute a departure from the basic principles of the invention to use as a last welded belt 16 for example a shaped element comprising for example a convex outer portion fitting after the welding step on the outer peripheral surface of the annular inflatable element.

The inflatable element according to the present invention may be used notably in the manufacture of rubber dinguies.

What is claimed is:

1. A method of making an inflatable element having the form of an closed ring, which comprises, forming an annular carcass of flexible weldable sheet material with a peripheral opening bounded on opposite sides by opposite lips of said carcass, providing a closing piece consisting of a closed belt of flexible weldable material having lips at its opposite lateral edges, inserting said closing piece in said peripheral opening of said carcass with lips of said closing piece turned inwardly and internally overlapping said lips of said carcass and with portions of said closing piece adjacent said lips folded inwardly on themselves with a weld barrier between said infolded portions and said lips of said closing piece, positioning a welding electrode in engagement with said infolded portions of said closing piece and contra-electrodes in engagement externally with said lips of said carcass, and activating said welding electrode and contra-electrodes to produce a sleeve coupling weld between said lips of said closing piece and said lips of said carcass throughout the periphery of said carcass to produce said closed ring.

2. A method according to claim 1, in which inward extensions of said lips of said closing piece are temporarily joined with one another to form a tube peripheral opening of said carcass.

3. A method of making an inflatable element having the form of a closed ring, which comprises, forming an annular carcass of flexible weldable sheet material with a peripheral opening bounded on opposite sides by lips of said carcass, providing a closing piece consisting of a closed belt of flexible weldable material having lips at its opposite lateral edges, inserting said closing piece in said peripheral opening of said carcass with a first lip of said closing piece turned inwardly and inwardly overlapping a first lip of said carcass, welding said inturned first lip of said closing piece to said first lip of said carcass, turning a second lip of said closing piece inwardly, positioning said inturned second lip of said closing piece in inwardly overlapping relation with a second lip of said carcass, and foling inwardly on itself a portion of said closing piece adjacent said second lip with a weld barrier between said infolded portion and said second lip of said closing piece, positioning a welding electrode in engagement with said infolded portion of said closing piece and a contra-electrode in engagment externally with said second lip of said carcass, and activating said welding electrode and contra-electrode to produce a sleeve coupling weld between said second lips of said closing piece and said carcass throughout the periphery of said carcass to porduce said closed ring.

4. A method according to claim 1 or claim 3, in which said carcass is made by providing two flexible rings of flexible weldable material, each of said rings having lips at its edges, and a belt of flexible weldable material having lips at its opposite edges, assembling said rings and belt with said rings spaced apart and with said belt positioned between said rings with lips of said belt inturned and inwardly overlapping lips of said rings, and welding said inturned lips of said belt to said lips of said rings in a sleeve coupling weld.

5. A method according to claim 4, in which a second belt of flexible weldable material having lips at its opposite edges is positioned between intermediate portions of said rings, and said lips of said second belt are welded to inner faces of said intermediate portions of said rings.

6. A method according to claim 1 or claim 3, in which material constituting said welding barrier is assembled with said closing piece prior to insertion of said closing piece in said peripheral opening of said carcass.

7. A method according to claim 1 or claim 3, in which said welding barrier is a free element which, upon completion of the weld is freely movable inside said annular inflatable element.

* * * * *